J. M. POWELL.
LAMP BRACKET.
APPLICATION FILED NOV. 29, 1912.
1,082,763.
Patented Dec. 30, 1913.
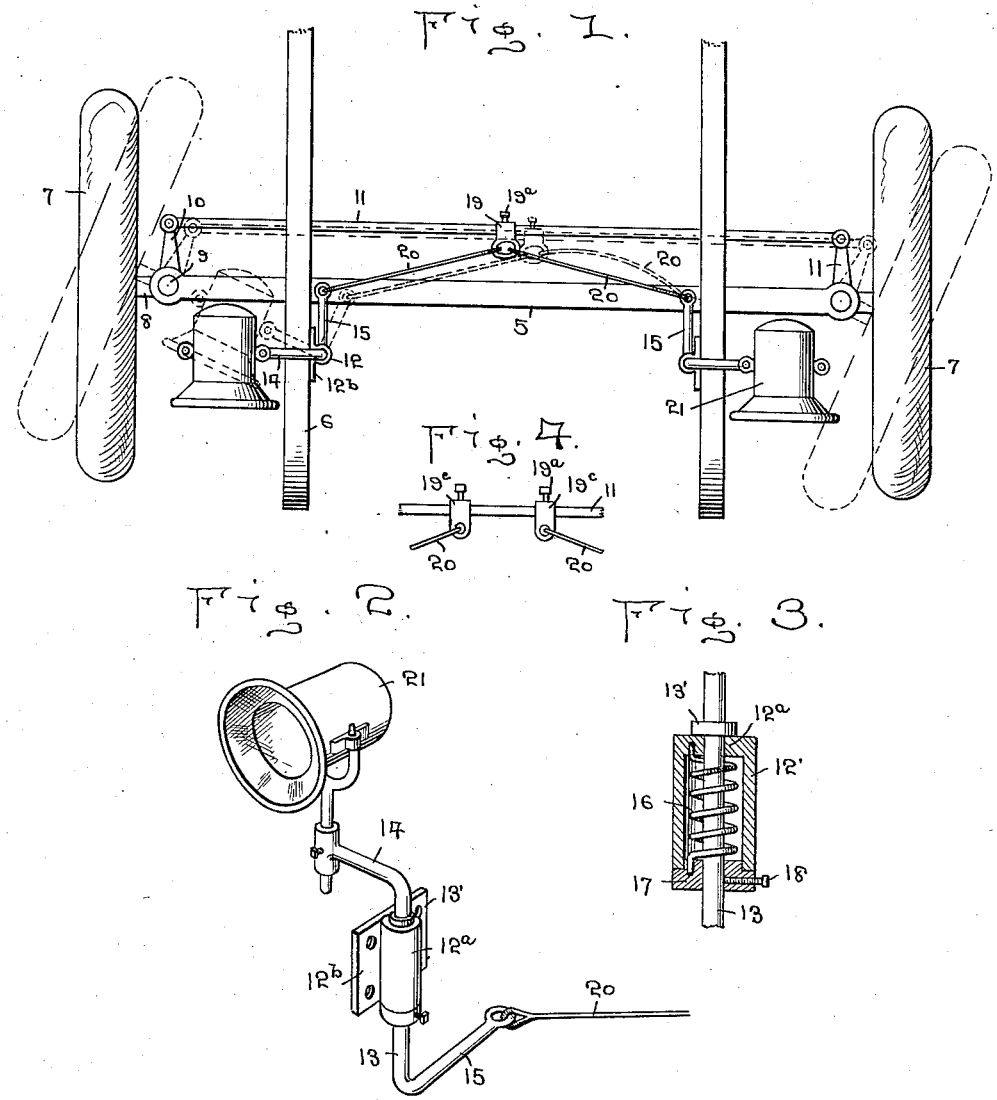

UNITED STATES PATENT OFFICE.

JOHN MAURICE POWELL, OF LOS GATOS, CALIFORNIA.

LAMP-BRACKET.

1,082,763.                    Specification of Letters Patent.     Patented Dec. 30, 1913.

Application filed November 29, 1912. Serial No. 734,120.

*To all whom it may concern:*

Be it known that I, JOHN MAURICE POWELL, a citizen of the United States, residing at Los Gatos, in the county of Santa Clara and State of California, have invented certain new and useful Improvements in Lamp-Brackets; and I do hereby declare the following to be a full, clear, and exact description of the invention, such as will enable others skilled in the art to which it appertains to make and use the same.

This invention relates to lamp brackets, and it more particularly relates to an improved form of movably mounted brackets for automobiles, or other conveyances.

An object of the invention is to provide a lamp-carrying attachment which may be pivotally mounted on the front part of an automobile and operatively connected with the steering mechanism thereof, for moving the lamp when the machine is steered in one direction and allowing the lamp to remain in its normal position when the machine is steered in the opposite direction or in a straightforward course.

Another object of the invention is to provide for equipping an automobile with two lamps, one of which will throw its light straight in front of the automobile while the other throws its light in a diagonal direction, or in the direction in which the machine is being steered.

Another object of the invention is to provide a device of this character which is of simple and economical construction and manufacture, easily applied, and entirely automatic in its movements.

Another object of the invention is to provide a device of this character which may be quickly and easily adjusted in position upon any automobile of ordinary construction.

With these objects in view, the invention consists in the improved construction, arrangement and combination of the parts of a device of the character specified, which will be hereinafter fully described, and afterward specifically claimed.

In the accompanying drawings which supplement this specification, Figure 1 is a top plan view of the forward portion of an automobile chassis and its adjuncts, and having my improved lamp brackets mounted thereon. Fig. 2 is a perspective view of the lamp bracket, disconnected from the automobile. Fig. 3 is a vertical sectional view through the stationary bracket member or support. Fig. 4 is a fragmental detail view embodying another slightly modified construction.

Referring to the drawings, in which similar reference numerals designate corresponding parts throughout the several views, the numeral 5 designates the front axle of an automobile, the side bars of the chassis being designated 6. The axle 5 is carried by the ordinary wheels 7 through the medium of stub axles 8 which are pivoted at 9 to the axle 5 and are adapted to be swung on the pivots 9 by means of the usual guiding arms 10, said guiding arms being pivotally connected with each other by means of a rod 11, and said rod 11 may be connected with the steering wheel (not shown) by any proper means, for swinging the wheels and their adjuncts into the dotted line position shown in Fig. 1. Secured onto each side bar 6 is a stationary bracket or support 12, consisting of a hollow cylindrical barrel 12′, a centrally apertured head $12^a$ and securing flanges $12^b$. Extending through the aperture of each head $12^a$ is a vertical rod 13 having a horizontally extending arm 14; formed on its upper end, and a horizontally extending arm 15 at its lower end; each of these arms extending at right angles to the rod 13 and at right angles to the other arm, so that when the bracket members 12 are secured in position, the respective arms 14 extend inwardly in opposite lateral directions over the side bars 6, while the arms 15 extend rearwardly. Each rod 13 is provided with a collar 13′ which rests upon the head $12^a$, for supporting the rods in proper relation to the barrels. A helical spring 16 is contained within each barrel 12, and said spring has one end secured to the head $12^a$, while its other end is secured in fixed and adjustable relation to the rod 13, and while this relation may be obtained in any proper way, I preferably employ a collar 17 which is secured to the rod 13 by means of a set screw 18, and to this collar 17 is secured the other end of the spring 16. On the rod 11 are adjustably secured anchoring members 19 to which are secured the ends of flexible links 20, the other ends of which connect with the arms 15. In Fig. 1, I have illustrated the links 20 as being flexible, and it may be understood that any suitable material or element may be employed for this purpose, such for instance as a chain, wire, flexible strip of metal or fabric, cable or the like.

The operation of the construction shown in Fig. 1 is as follows: When the rod 11 is shifted laterally into its dotted line position, the wheels are also shifted into their dotted line position, so that the machine, if in motion, would be turning around a right hand curve. It will be seen by the dotted line position of the right hand lamp that the light therefrom would be thrown in the direction of the curve, while the left hand lamp would be throwing its light straight in front of the chassis, the same as if the machine was moving in a straightforward direction. It will also be seen that the left hand link 20 has become slack, and has swung rearwardly into the dotted line position thereof. From the foregoing, it is obvious that if the wheels were swung so as to travel toward the left, the rod 11, in moving rightward, would cause the right hand link 20 to become slack, while drawing the left hand link 20 taut and thereby pulling the left hand lever-arm 15 and swinging the left hand lamp 21 into such position that it would throw its light in a left hand direction, while the right hand lamp would remain in its full line position, having been returned to said full line position by means of the spring 16, and now being retained in said full line position by means of the said spring 16.

When it is desired to adjust the springs 16 for holding the lamps in their proper normal position, the screw 18 may be loosened and the collar 17 may then be rotated upon the shaft 13 until the proper position has been obtained and then the screw 18 is tightened. The collar 17 also serves as a securing means for preventing the upward movement of the shaft 13 relative to the supporting member thereof.

In the modified construction shown in Fig. 4, the links 20 are connected to clamps or anchoring members 19$^c$, adjustably secured on the rod 11 by means of set screws 19$^d$.

It will be seen that I have provided a device of this character which is fully capable of attaining the foregoing objects and in a thoroughly practical and efficient manner.

I do not limit my invention to the exact details of construction, combination and arrangement of parts as herein illustrated and described, but they may only be limited by a reasonable interpretation of the claims.

I claim:

1. The combination of the frame of a vehicle, vertical rods pivotally mounted thereon, lamps secured to the upper ends of said rods, crank arms at the lower ends of said rods, means for automatically and yieldingly holding the lamps in straight forward positions, a cross rod mounted in the frame and connected with the steering gear for longitudinal movement, and flexible connections between said rod and the crank arms of the vertical lamp supporting rod.

2. The combination of the frame of a vehicle, vertical rods pivotally mounted thereon, lamps secured to the upper ends of said rods, crank arms at the lower ends of said rods, means for automatically and yieldingly holding the lamps in straight forward positions, a cross rod mounted in the frame and connected with the steering gear for longitudinal movement, an adjustable block on said cross rod, and flexible connections between said block and the crank arms of the vertical lamp supporting rod.

3. The combination of a vehicle frame, a bracket secured at each side thereof, comprising two vertical barrels having open bottoms, a collar rotatable in each open bottom, a vertical rod seated in each barrel and passing through the top thereof and the collar, a set screw securing each collar upon its rod, a spring in each barrel around each rod secured at the top to the top of the barrel and at the bottom to the collar, a lamp secured on each rod, a crank arm at the bottom of each rod, a cross rod movable longitudinally by the steering gear, and flexible connections between the crank arms and the cross rod.

In testimony whereof I have signed my name to this specification in the presence of two subscribing witnesses.

JOHN MAURICE POWELL.

Witnesses:
W. H. COVELL,
E. M. SELLERS.

---

Copies of this patent may be obtained for five cents each, by addressing the "Commissioner of Patents, Washington, D. C."